United States Patent
Donovan (10) Patent No.: US 7,324,117 B1
(45) Date of Patent: Jan. 29, 2008

(54) METHOD AND APPARATUS FOR USING NON-POWER OF TWO DIMENSION TEXTURE MAPS

(75) Inventor: Walter E. Donovan, Saratoga, CA (US)

(73) Assignee: NVIDIA Corporation, Santa Clara, CA (US)

( * ) Notice: Subject to any disclaimer, the term of this patent is extended or adjusted under 35 U.S.C. 154(b) by 512 days.

(21) Appl. No.: 10/811,641

(22) Filed: Mar. 29, 2004

(51) Int. Cl.
*G09G 5/00* (2006.01)
*G06T 17/00* (2006.01)

(52) U.S. Cl. .............. 345/582; 345/586; 345/587; 345/428

(58) Field of Classification Search .......... 345/428, 345/552, 582–588
See application file for complete search history.

(56) References Cited

U.S. PATENT DOCUMENTS

| | | | | |
|---|---|---|---|---|
| 5,945,997 A | * | 8/1999 | Zhao et al. ............... | 345/581 |
| 6,304,268 B1 | * | 10/2001 | Iourcha et al. ............ | 345/428 |
| 6,518,974 B2 | * | 2/2003 | Taylor et al. ............. | 345/582 |
| 7,057,623 B1 | * | 6/2006 | Bentz .................... | 345/582 |

OTHER PUBLICATIONS

Williams, Lance, "Pyramidal Parametrics", *Computer Graphics*, vol. 17, No. 3, Jul. 1983.

\* cited by examiner

*Primary Examiner*—Kee M. Tung
*Assistant Examiner*—Hau H Nguyen
(74) *Attorney, Agent, or Firm*—Patterson & Sheridan, LLP (57) ABSTRACT

An apparatus and method for using non-power of two texture maps is described. Texture map coordinates for a non-power of two dimension texture map such as u and v are computed without requiring a division operation. In addition to accessing non-power of two texture maps, the texture map coordinates may be used to access filtered versions of the non-power of two texture map, where the dimensions of each filtered version is arbitrary.

16 Claims, 7 Drawing Sheets

FIG. 1A

PRIOR ART

FIG. 1B

PRIOR ART

METHOD AND APPARATUS FOR USING NON-POWER OF TWO DIMENSION TEXTURE MAPS

FIELD OF THE INVENTION

One or more aspects of the invention generally relate to computer graphics, and more particularly to texture map data.

BACKGROUND

Conventional graphics processors are exemplified by systems and methods developed to read and filter texture map samples. Traditionally when a video image is used as a texture map it is first resampled to produce an "n×m" dimension texture map where n and m are each a power of two. Specifically, an "n" or "m" that is a power of two may be expressed as $n=2^i$ or $m=2^i$, respectively, where i is an integer. Furthermore, to simplify the texture map filtering performed within a graphics processor, the n×m dimension texture map is filtered and various resolutions of the filtered texture are stored as mip mapped texture maps.

Figure 1A:
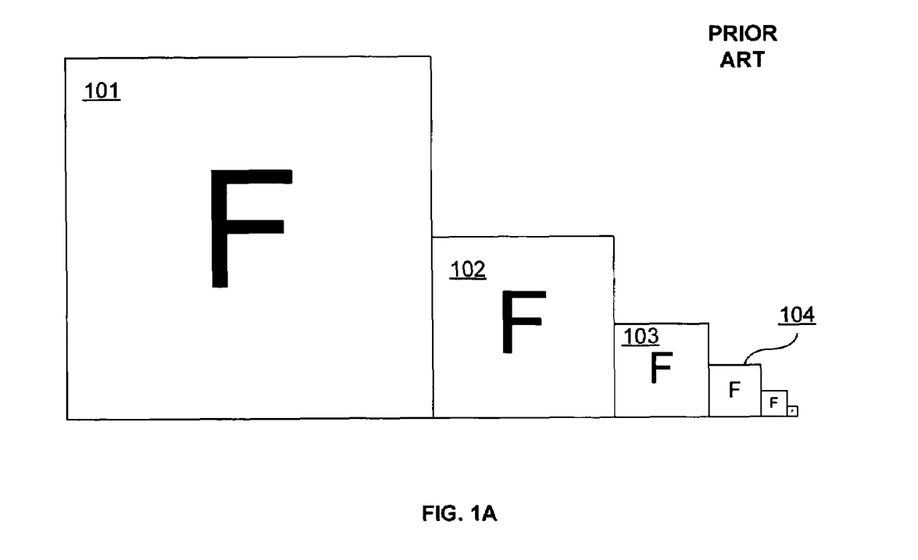
FIG. 1A is a diagram of prior art showing a mip mapped texture map.
Figure 1B:
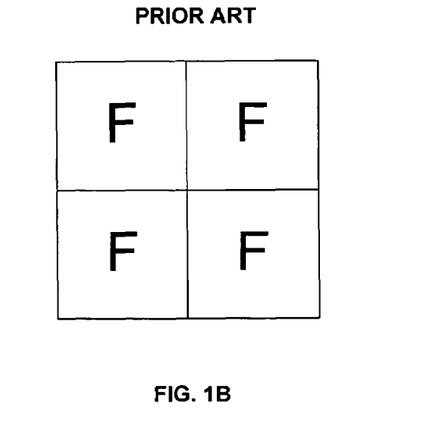
FIG. 1B illustrates a prior art application of a texture map to a surface using a repeat wrap mode.
Figure 1C:
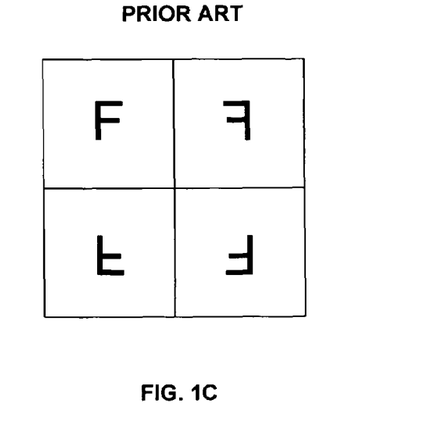
FIG. 1C illustrates a prior art application of a texture map to a surface using a mirror wrap mode.

FIG. 1A is a conceptual diagram of prior art showing a mip mapped texture including a highest resolution texture map, such as the n×m dimension texture map Texture Map 101. A Texture Map 102, a Texture Map 103, and a Texture Map 104 are successively lower resolution texture maps, mip maps, each storing filtered texels. Each mip map level texture map dimension is half the size of the previous (finer) mip map level texture map dimension, but not less than one. Traditionally texture map dimensions are powers of two in order to simplify computations used to convert from normalized texture coordinates to unnormalized texture coordinates. The unnormalized texture coordinates are then used to read texture map samples from memory. Power of two texture maps are also used to simplify computations used to support the wrap modes shown in FIGS. 1B and 1C. FIG. 1B illustrates a texture map applied to a square surface using a "repeat" wrap mode. FIG. 1C illustrates a texture map applied using a "mirror" wrap mode.

Accordingly, there is a need to use a video image as a texture map without resampling the video image to generate a power of two texture map. Furthermore, there is a need to apply a video image or other non-power of two texture map to a surface using a repeat or mirror wrap mode.

SUMMARY

The current invention involves new systems and methods for using non-power of two texture maps. A non-power of two dimension image may be used as a texture map without resampling to produce a power of two dimension texture map. Furthermore, a non-power dimension texture map may be applied to a surface using a wrap mode, including a repeat, mirror, clamp to border, or clamp to edge wrap mode.

Various embodiments of a method of the invention include receiving a normalized texture map coordinate corresponding to a non-power of two texture map, receiving a non-power of two LOD dimension corresponding to the non-power of two texture map, and scaling the normalized texture map by the non-power of two LOD dimension to compute an unnormalized texture map coordinate for the a non-power of two texture map.

Various embodiments of another method of the invention include receiving a normalized texture map coordinate corresponding to a non-power of two texture map, receiving an LOD dimension corresponding to the non-power of two texture map, obtaining a reduced portion of the normalized texture map coordinate, and scaling the reduced portion by the LOD dimension to compute an unnormalized texture map coordinate.

Various embodiments of the invention include a coordinate computation unit for determining texture map coordinates for non-power of two texture maps. The coordinate computation unit includes a parameter conversion unit and a scale unit. The parameter conversion unit is configured to receive a normalized texture coordinate corresponding to a non-power of two texture map and produce a reduced portion of the normalized texture coordinate. The scale unit is configured to receive the reduced portion of the normalized texture coordinate and produce an unnormalized texture map coordinate for the non-power of two texture map.

Various embodiments of the invention include a programmable graphics processor for using non-power of two texture maps.

BRIEF DESCRIPTION OF THE VARIOUS VIEWS OF THE DRAWINGS

Accompanying drawing(s) show exemplary embodiment(s) in accordance with one or more aspects of the present invention; however, the accompanying drawing(s) should not be taken to limit the present invention to the embodiment(s) shown, but are for explanation and understanding only.

DISCLOSURE OF THE INVENTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 2A:
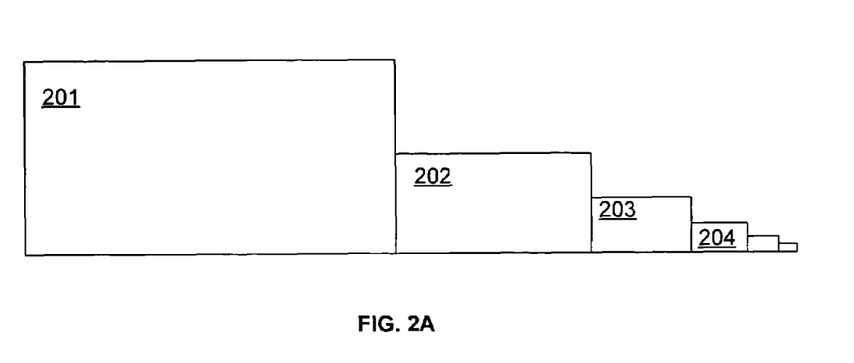
FIGS. 2A, 2B and 2C are diagrams showing a mip mapped non-power of two texture map in accordance with one or more aspects of the present invention.

In conventional graphics processing, an image with a non-power of two dimension, such as a video frame, is resampled to produce a power of two texture map that is designated as the highest resolution level of detail (LOD) texture map, LOD0. FIG. 2A is a diagram showing a mip mapped non-power of two rectangular texture map in accordance with one or more aspects of the present invention. A non-power of two Texture Map 201 designated as LOD0 may be an image that has not been resampled, such as a video frame. A Texture Map 202 (LOD1), a Texture Map 203 (LOD2), and a Texture Map 204 (LOD3) are mip map texture maps that are filtered versions of Texture Map 201. Each dimension, size_LODN, of a LODN mip map texture map in FIG. 2A may be computed using the following equation:

$$\text{size\_LODN} = \text{floor}(\text{size\_LOD0}/2^{LODN} + 0.5),$$

where size_LOD0 is the width or height in texels of the LOD0 level texture map. Another equation, $$\text{size\_LODN} = \text{ceil}(\text{size\_LOD0}/2^{LODN}),$$

may be used to compute each dimension of a LODN mip map texture map. Still another equation, $$\text{size\_LODN} = \text{floor}(\text{size\_LOD0}/2^{LODN}),$$

may be used to compute each dimension of a LODN mip map texture map.

For example, in one embodiment Texture Map 201 is 223×111 texels, Texture Map 202 is 112×56 texels, Texture Map 203 is 56×28 texels, and Texture Map 204 is 28×14 texels. Therefore, a dimension of at least one mip map texture map is greater than half of the corresponding dimension in the adjacent higher resolution map. In an alternate embodiment, Texture Maps 201, 202, 203, and 204 are more than two dimensions and a size_LODN may be computed for each dimension.

Figure 2B:
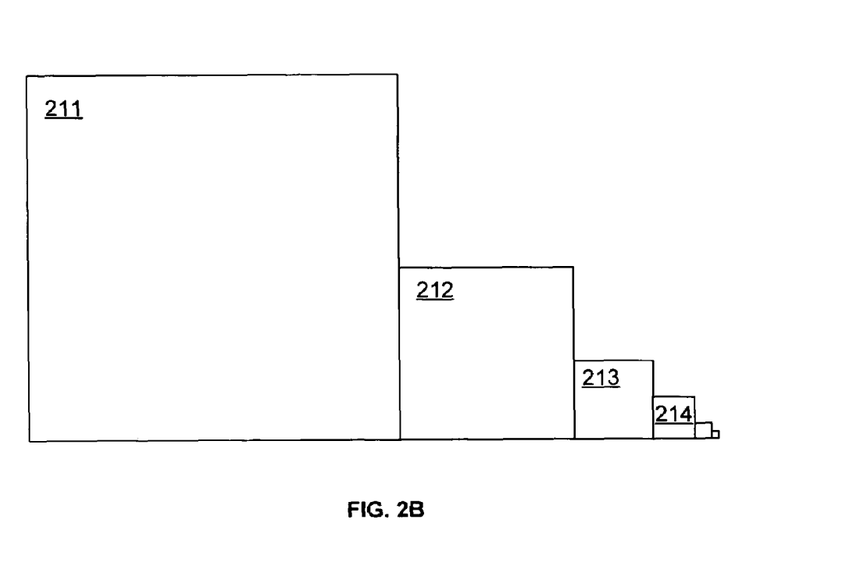

FIG. 2B is another diagram showing a mip mapped non-power of two texture map in accordance with one or more aspects of the present invention. Like Texture Map 201, a non-power of two Texture Map 211 designated as LOD0 may be an image that has not been resampled, such as a video frame. A Texture Map 212 (LOD1), a Texture Map 213 (LOD2), and a Texture Map 214 (LOD3) are mip map texture maps that are filtered versions of Texture Map 211. Unlike the mip map texture maps shown in FIG. 1A, each dimension of a mip map texture map in FIG. 2B is not half of the adjacent, higher-resolution mip map texture map. For example, in one embodiment Texture Map 211 is 223×223 texels, Texture Map 212 is 111×11 texels, Texture Map 213 is 55×55 texels, and Texture Map 214 is 27×27 texels. Therefore, a dimension of a mip map texture map may be less than half of the corresponding dimension in the adjacent higher resolution map. Each dimension, size_LODN, of a LODN mip map texture map in FIG. 2B may be computed using the following equation:

$$\text{size\_LODN} = \text{floor}(\text{size\_LOD0}/2^{LODN}).$$

In an alternate embodiment, Texture Maps 211, 212, 213, and 214 are rectangular non-power of two texture maps. In a further alternate embodiment, Texture Maps 211, 212, 213, and 214 are more than two dimensions.

Figure 2C:
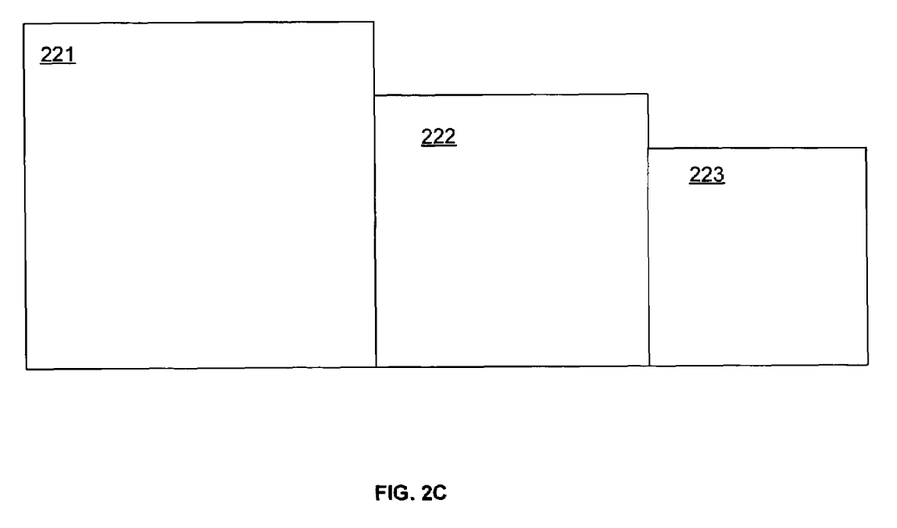

FIG. 2C is another diagram showing a mip mapped non-power of two texture map in accordance with one or more aspects of the present invention. Like Texture Maps 201 and 211, a non-power of two Texture Map 221 designated as LOD0 may be an image that has not been resampled, such as a video frame. A Texture Map 222 (LOD1) and a Texture Map 223 (LOD2) are mip map texture maps that are filtered versions of Texture Map 221. Again, unlike the mip map texture maps shown in FIG. 1A, each dimension of a mip map texture map in FIG. 2C is not half of the adjacent, higher-resolution mip map texture map. For example, in one embodiment Texture Map 221 is 223×223 texels, Texture Map 222 is 157×157 texels, and Texture Map 223 is 111×111 texels. Therefore, a dimension of a mip map texture map may be greater than half of the corresponding dimension in the adjacent higher resolution map. Each dimension, size_LODN, of a LODN mip map texture map in FIG. 2C may be computed using the following equation:

$$\text{size\_LODN} = \text{floor}(\text{size\_LOD0}/2^{(LODN/2)}).$$

In another embodiment size_LODN is equal to size_LOD0, and the lowest LOD mip map contains identical texels, e.g., each texel is LOD0 filtered to 1×1. In an alternate embodiment, Texture Maps 221, 222, and 223 are rectangular non-power of two texture maps. In a further alternate embodiment, Texture Maps 221, 222, and 223 are more than two dimensions.

Each texel within a texture map corresponds to unnormalized texture coordinates, such as u, v, and p. The unnormalized texture coordinates are used to specify a particular texel and compute an address that is used to read the texel from memory. Unnormalized texture coordinates, e.g., u and v, within Texture Map 211 range from 0 to 222 (size_LOD0−1), where size_LOD0 is the size of a dimension, e.g., width or height, in texels of LODN. Unnormalized texture coordinates within Texture Map 212 range from 0 to 110 and are typically represented in a fixed point format. Unnormalized texture coordinates may also lie outside of a texture map, in which case a wrap mode is used to determine how the unnormalized texture coordinate is modified to lie within the texture map. Unnormalized texture coordinates associated with a surface are determined using normalized texture coordinates, such as s, t, and r, corresponding to each pixel within the surface. The normalized texture coordinates are typically represented in a floating point format and are normalized, ranging in value from 0 to 1 within a LOD texture map. Normalized texture coordinates may also lie outside of a texture map, in which case the wrap mode is used to determine how the normalized texture coordinate is modified to lie within the texture map. Power of two texture map unnormalized texture coordinates associated with a surface are determined using normalized texture coordinates corresponding to each pixel within the surface, using techniques known to those skilled in the art. For example, when power of two texture maps are used, an unnormalized texture coordinate, u for an LODN level texture map may be computed from normalized texture coordinate, s, using the following equation:

$$\begin{aligned} U_{LODN} &= (s * \text{size\_LOD0})/2^{LODN} \\ &= (s * 2^{log2(\text{size\_LOD0})})/2^{LODN} \\ &= s * 2^{log2(\text{size\_LOD0}-LODN)}, \end{aligned}$$

where size_LOD0 is the size in texels of a dimension of the LOD0 level texture map. When width_LOD0 is a power of two, the multiplication may be simplified; typically a shift operation is used. Furthermore, a wrapped u coordinate, u', for a power of two texture map wrapped using a repeat wrap mode may be computed as a function of $u_{LODN}$ and size_LODN:

$$u'_{LODN} = u_{LODN} \bmod \text{size\_LODN},$$

where mod is the modulus operator and size_LODN is the size in texels of a dimension of the LODN level texture map. Computing a wrapped texture coordinate for a power of two texture map is straightforward because modulo a power of two may be computed using a Boolean AND operation.

When the same technique is used to calculate an unnormalized texture coordinate for a non-power of two, some problems may occur. For example, when an s of 222.5/223 and Texture Map 211 are used, $u_{LOD0}$ is computed to be 222.5, using the previous equation: $(s*\text{size\_LOD0})/2^{LODN}$. The corresponding unnormalized texture coordinate for Texture Map 212, $u_{LOD1}$ is computed as 111.25, using the previously mentioned equation:

$$\text{size\_LODN} = \text{floor}(\text{size\_LOD0}/2^{(LODN/2)}).$$

The problem of 111.25 lying outside of Texture Map 212 may be avoided by using a different method to calculate an unnormalized texture coordinate from a normalized texture coordinate, as described further herein.

Figure 3A:
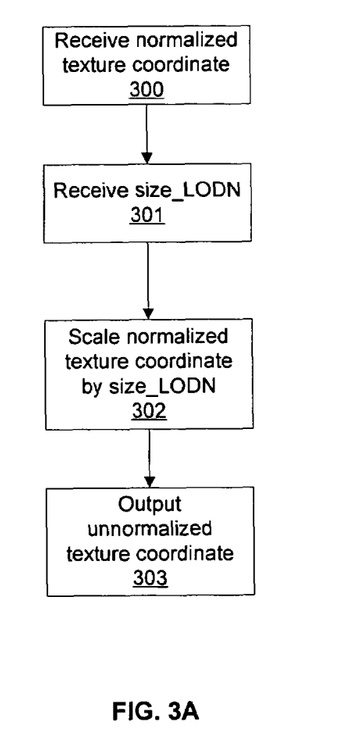
FIG. 3A illustrates an embodiment of a method of producing an unnormalized texture map coordinate for a non-power of two texture map in accordance with one or more aspects of the present invention.

FIG. 3A illustrates an embodiment of a method of producing an unnormalized texture map coordinate for a non-power of two texture map using a normalized texture map coordinate in accordance with one or more aspects of the present invention. In step 300 a normalized texture coordinate, such as s or t is received. A LOD, LODN, specifying a specific texture map within a set of mip mapped texture maps is determined using a technique known to those skilled in the art. In step 301 a non-power of two size of texture map, such as width, corresponding to the LODN, size_LODN, is received. For example, when LOD0 is used, the size_LODN received for the width dimension of Texture Map 201, LOD0_size is 223. Likewise, when LOD1 is used, the size_LODN received for the width dimension of Texture Map 202, LOD1_size is 112. In an alternative embodiment, another LOD dimension, such as a height, depth, or the like is received in step 301.

In step 302 the normalized texture coordinate is scaled by the size_LODN, received in step 302, producing the unnormalized texture coordinate. For example, an unnormalized texture coordinate, $u_{LODN}$, for a non-power of two texture map is computed using a normalized texture coordinate, s, according to the following equation:

$$u_{LODN} = s*\text{size\_LODN}.$$

Because the size_LODN is not a power of two, the scale operation is performed using multiplication instead of shifting the normalized texture coordinate by $\log_2 \text{size\_LODN}$. The unnormalized texture map coordinate corresponds to the normalized texture map coordinate received in step 300 for the non-power of two texture map. In step 303 the unnormalized texture map coordinate for the non-power of two texture map is output. The unnormalized texture map coordinate may be used to compute texture indices using techniques known to those skilled in the art.

Figure 3B:
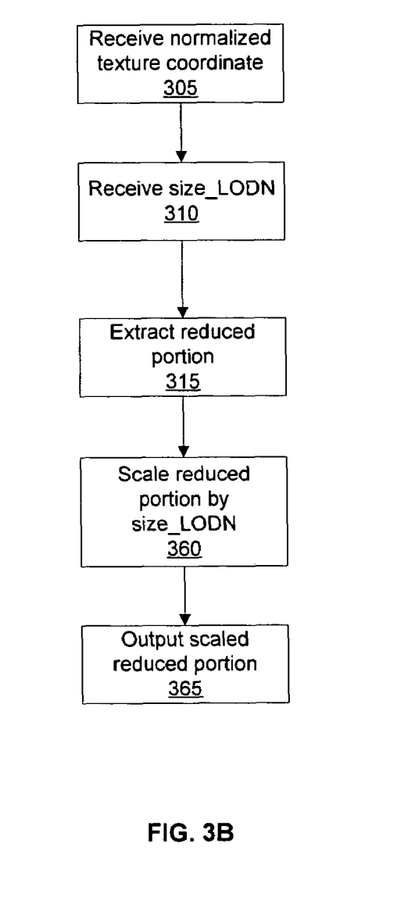
FIG. 3B illustrates an embodiment of a method of producing a texture map coordinate for a non-power of two texture map in accordance with one or more aspects of the present invention.

FIG. 3B illustrates another embodiment of a method of producing an unnormalized texture map coordinate for a non-power of two texture map, that is wrapped based on a wrap mode, using a normalized texture map coordinate in accordance with one or more aspects of the present invention. In step 305 a normalized texture coordinate, such as s or t is received. In step 310 the size of the texture map corresponding to the LODN, size_LODN, is received. For example, when LOD0 is used, the size_LODN received for the width dimension of Texture Map 201 is 223. Likewise, when LOD1 is used, the size_LODN received for the width dimension of Texture Map 202 is 112. In an alternative embodiment, another LOD dimension, such as a height, depth, or the like is received in step 310.

In step 315 a reduced portion of the normalized texture coordinate, e.g., s', t', or r', is extracted based on a wrap mode. The wrap mode may be selected by a user, specified for a particular texture map, or determined by an application program. A method for determining the reduced portion is described in conjunction with FIG. 3C.

In step 360 the reduced portion is scaled by the size_LODN, received in step 310, producing the scaled reduced portion. For example, an unnormalized texture coordinate, $u_{LODN}$, is computed using a wrapped normalized texture coordinate, s', according to the following equation:

$$u_{LODN} = s'*\text{size\_LODN}.$$

Because the size_LODN is not a power of two, the scale operation is performed using multiplication instead of shifting the reduced portion by $\log_2 \text{size\_LODN}$. The unnormalized texture map coordinate wrapped according to a wrap mode, corresponds to the normalized texture map coordinate received in step 305 for the non-power of two texture map. In step 365 the scaled reduced portion is output. The scaled reduced portion may be used to compute texture indices using techniques known to those skilled in the art.

Figure 3C:
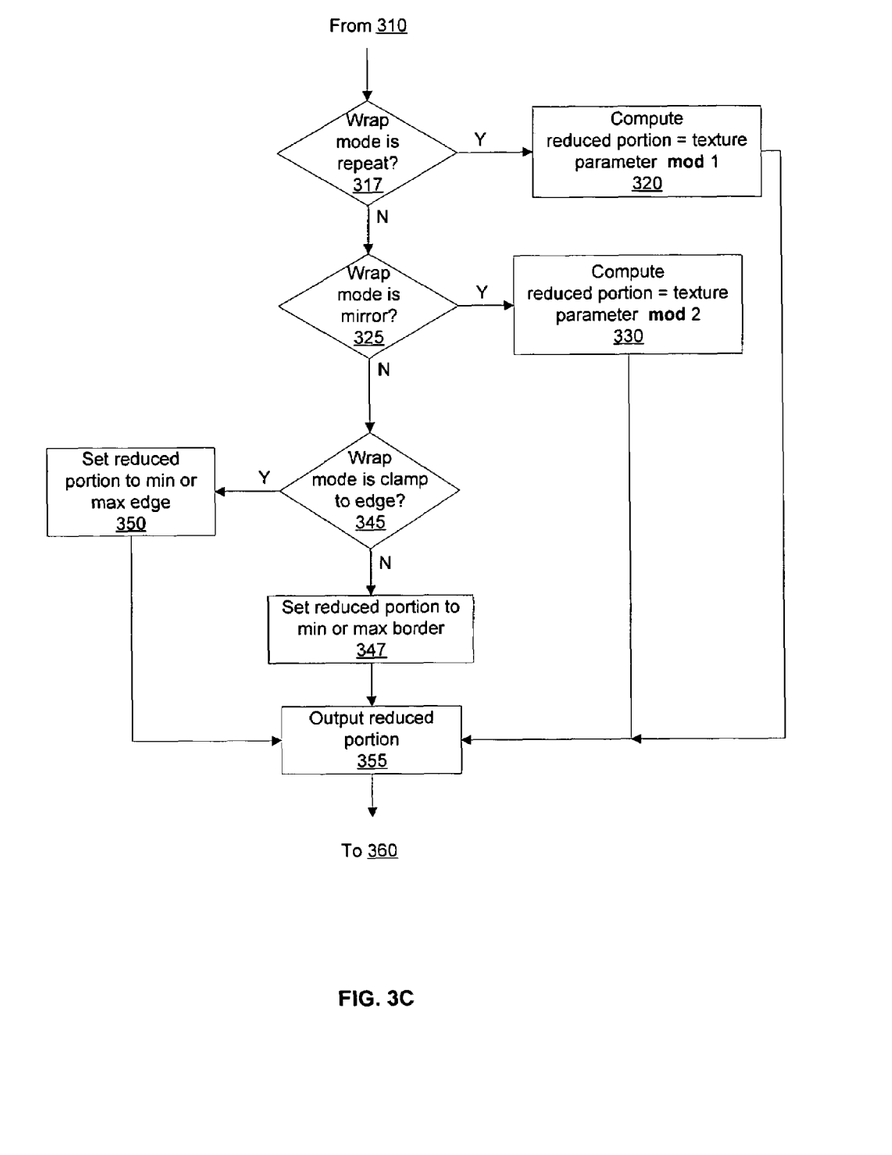
FIG. 3C illustrates an embodiment of a method of determining a reduced portion of a texture map coordinate in accordance with one or more aspects of the present invention.

FIG. 3C illustrates an embodiment of a method of performing step 315 of FIG. 3B, i.e., determining a reduced portion of a normalized texture map coordinate, in accordance with one or more aspects of the present invention. In step 317, the method determines if the repeat wrap mode is used, and, if so, then the method proceeds to step 320. Otherwise, the method proceeds to step 325. In step 320 the reduced portion, such as s', is computed, based on the repeat wrap mode, using the following equation:

$$\text{reduced portion} = s \bmod 1,$$

where s is the normalized texture coordinate received in step 305 and mod is the modulus operator. s mod 1 returns the fractional portion of s, i.e., a number ranging in value from 0 up to, but not including 1. Alternatively, s may be computed using s-floor(s). After computing the reduced portion, the method proceeds to step 355.

In step 325, the method determines if the mirror wrap mode is used, and, if so, the method proceeds to step 330. Otherwise, the method proceeds to step 345. In step 330 the reduced portion is computed, based on the mirror wrap mode, using the following equation:

$$\text{reduced portion} = s \bmod 2,$$

where s is the normalized texture coordinate received in step 305. The mirror wrap mode effectively repeats half as frequently as the repeat wrap mode, hence mod 2 is used instead of mod 1. Therefore, the reduced portion will range in value from 0 up to, but not including 2. Alternatively, s may be computed using $2*((s/2)-\text{floor}(s/2))$. After computing the reduced portion, the method proceeds to step 355.

In step 345 the method determines if the clamp to edge wrap mode is used, and, if so, the method proceeds to step 350. Otherwise, a clamp to border wrap mode is used, and, in step 347 the reduced portion is clamped to a maximum value that is less than, $1+(1/(2*\text{size\_LODN}))$ when it is greater than or equal to the maximum value or clamped to a minimum value, −1/(2*size_LODN), when it is less than the minimum value. After computing the reduced portion in step 347, the method proceeds to step 355. In step 350 the reduced portion is clamped, using the clamp to edge wrap mode, to a maximum value that is less than, 1−(1/(2*size_LODN)) when it is greater than or equal to the maximum value or clamped to a minimum value, 1/(2*size_LODN), when it is less than the minimum value. After computing the reduced portion in step 350, the method proceeds to step 355. In step 355 the reduced portion is determined and the method proceeds to step 360 as described in conjunction with FIG. 3B.

Therefore, persons skilled in the art will appreciate that any system configured to perform the method steps of FIGS. 3A, 3B, and 3C, or their equivalents, is within the scope of the present invention. Furthermore, persons skilled in the art will appreciate that the method steps of FIGS. 3A and 3B may be extended to support non-square texture maps. For example, size_LODN may represent any LOD dimension, such as width, height, or in the case of three or higher dimensional textures, depth. Additionally, each texture map dimension may be wrapped according to a separate wrap mode.

Figure 4:
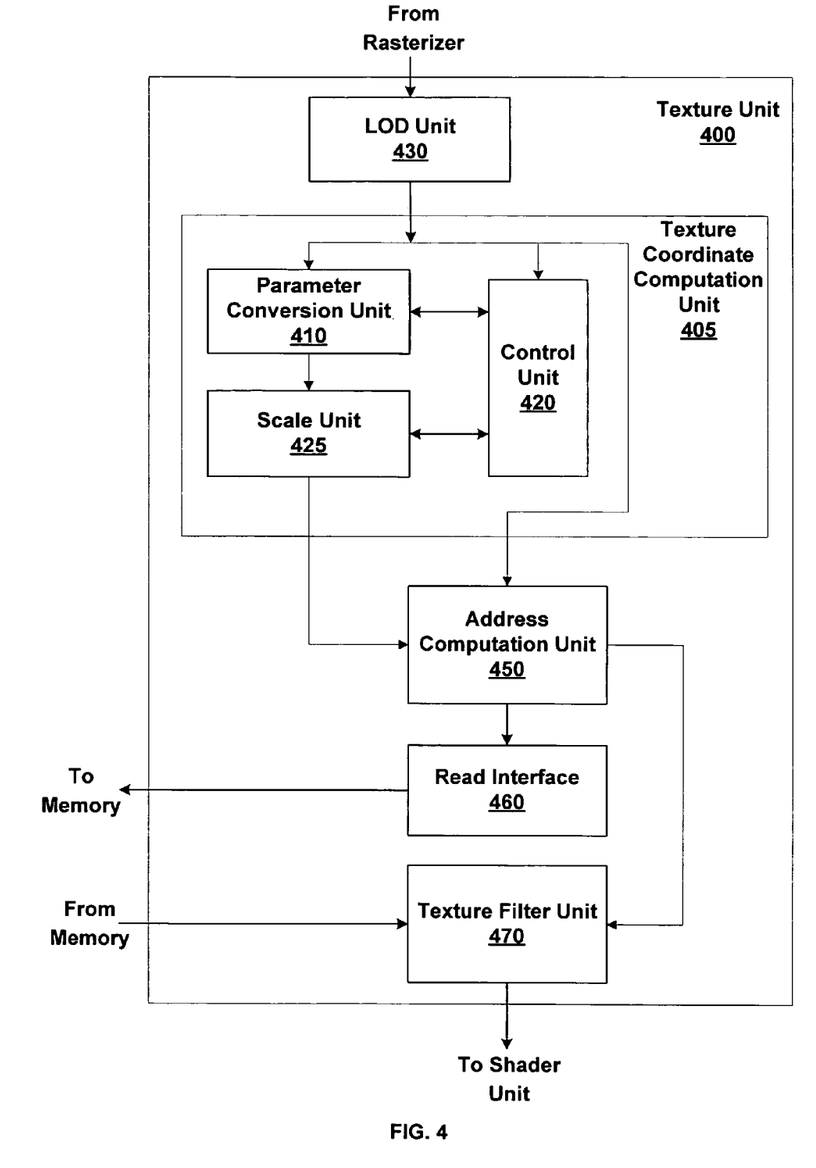
FIG. 4 is a block diagram of a portion of a shader unit including a texture unit in accordance with one or more aspects of the present invention.
Figure 5:
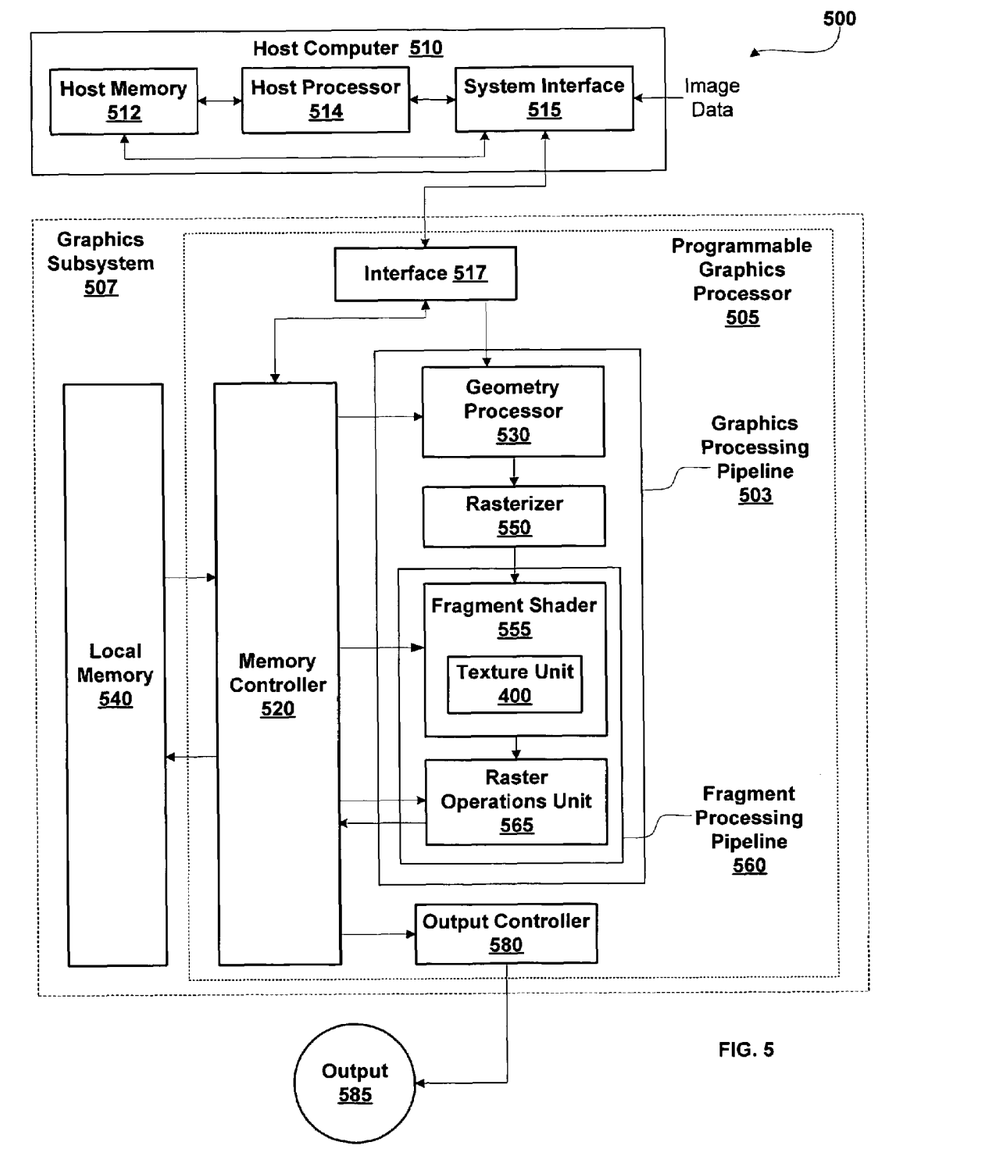
FIG. 5 is a block diagram of an exemplary embodiment of a respective computer system in accordance with one or more aspects of the present invention including a host computer and a graphics subsystem.

FIG. 4 is a block diagram of a portion of a graphics processing pipeline, to be described further herein in conjunction with FIG. 5. The graphics processing pipeline includes a Texture Unit 400 in accordance with one or more aspects of the present invention. In some embodiments, Texture Unit 400 receives data from a rasterizer, e.g., program instructions, and parameters associated with fragments (texture IDs, texture coordinates such as s and t, and the like). A fragment is formed by the intersection of a pixel and a primitive. Primitives include geometry, such as points, lines, triangles, quadrilaterals, meshes, surfaces, and the like. A fragment may cover a pixel or a portion of a pixel. Likewise, a pixel may include one or more fragments.

Texture Unit 400 includes an LOD Unit 430 which receives texture parameters and determines LOD values using a technique known to those skilled in the art. In some embodiments LOD Unit 430 outputs a size_LODN corresponding to each LOD value that is output. Texture Unit 400 includes a Texture Coordinate Computation Unit 405. A Control Unit 420 within Texture Coordinate Computation Unit 405 processes the program instructions, such as instructions to set the wrap mode.

Parameters produced by the rasterizer are output by LOD Unit 430 and received by a Parameter Conversion Unit 410 within Texture Coordinate Computation Unit 405. Parameter Conversion Unit 410 computes the reduced portion using the method previously described in conjunction with FIG. 3C based on the wrap mode information received from Control Unit 420. The reduced portion is output by Parameter Conversion Unit 410 to Scale Unit 425. Alternatively, when a wrapping is not enabled, Parameter Conversion Unit 410 outputs the normalized texture coordinate.

Scale Unit 425 may include storage elements, e.g., registers, to store size_LODN values corresponding to texture maps. In an alternate embodiment, Scale Unit 425 receives size_LODN values from Control Unit 420. Scale Unit 425 scales the reduced portion by the size_LODN to produce an unnormalized texture coordinate that is wrapped according to a wrap mode. Alternatively, Scale Unit 425 scales the normalized texture coordinate by the size_LODN to produce an unnormalized texture coordinate.

Scale Unit 425 outputs unnormalized texture coordinates to an Address Computation Unit 450. Address Computation Unit 450 uses unnormalized texture coordinates such as, u and v and other texture information, such as a texture ID received by Texture Unit 400, to determine addresses for reading texels from memory. In some embodiments Texture Coordinate Computation Unit 405 determines and outputs weights for use in filtering the texels read from memory. In other embodiments, another unit (not shown) in Texture Unit 400 determines the weights, using techniques known to those skilled in the art.

Address Computation Unit 450 outputs the addresses to a Read Interface 460. Read Interface 460 outputs the addresses and a read request to a memory, e.g., cache, RAM, ROM, or the like. Texels read from memory are received from the memory by a Texture Filter Unit 470. Texture Filter Unit 470 receives the weights from Address Computation Unit 450 and filters the texels read from memory using bilinear interpolation, trilinear interpolation, anisotropic filtering, or the like, to produce filtered texels. The filtered texels are output to a shader unit, described further herein, to compute a color for each fragment.

FIG. 5 is a block diagram of an exemplary embodiment of a Computing System generally designated 500 and including a Host Computer 510 and a Graphics Subsystem 507 including an embodiment of Texture Unit 400. Computing System 500 may be a desktop computer, server, laptop computer, palm-sized computer, tablet computer, game console, cellular telephone, PDA or other portable wireless appliance, computer based simulator, or the like. Host computer 510 includes Host Processor 514 that may include a system memory controller to interface directly to Host Memory 512 or may communicate with Host Memory 512 through a System Interface 515. System Interface 515 may be an I/O (input/output) interface or a bridge device including the system memory controller to interface directly to Host Memory 512. Examples of System Interface 515 known in the art include Intel® Northbridge and Intel® Southbridge. System Interface 515 can receive image data, such as video images, or the like. The image data, including non-power of two dimension images can be stored in Host Memory 512 or a Local Memory 540 within Graphics Subsystem 507 for use as a texture map.

Host computer 510 communicates with Graphics Subsystem 507 via System Interface 515 and an Interface 517. Graphics Subsystem 507 includes Local Memory 540 and a Programmable Graphics Processor 505. Programmable Graphics Processor 505 uses memory to store graphics data, including texture maps, and program instructions, where graphics data is any data that is input to or output from computation units within Programmable Graphics Processor 505. Texture maps stored in graphics memory may include non-power of two texture maps. Graphics memory is any memory used to store graphics data or program instructions to be executed by Programmable Graphics Processor 505. Graphics memory can include portions of Host Memory 512, Local Memory 540 directly coupled to Programmable Graphics Processor 505, storage resources coupled to the computation units within Programmable Graphics Processor 505, and the like. Storage resources can include register files, caches, FIFOs (first in first out memories), and the like.

In addition to Interface 517, Programmable Graphics Processor 505 includes a Graphics Processing Pipeline 503, a Memory Controller 520 and an Output Controller 580. Data and program instructions received at Interface 517 can be passed to a Geometry Processor 530 within Graphics Processing Pipeline 503 or written to Local Memory 540 through Memory Controller 520. In addition to communicating with Local Memory 540, and Interface 517, Memory Controller 520 also communicates with Graphics Processing Pipeline 503 and Output Controller 580 through read and write interfaces in Graphics Processing Pipeline 503 and a read interface in Output Controller 580.

Within Graphics Processing Pipeline 505, Geometry Processor 530 and a programmable graphics fragment processing pipeline, Fragment Processing Pipeline 560, perform a variety of computational functions. Some of these functions are table lookup, scalar and vector addition, multiplication, division, coordinate-system mapping, calculation of vector normals, tessellation, calculation of derivatives, interpolation, and the like. Geometry Processor 530 and Fragment Processing Pipeline 560 are optionally configured such that data processing operations are performed in multiple passes through Graphics Processing Pipeline 503 or in multiple passes through Fragment Processing Pipeline 560. Each pass through Programmable Graphics Processor 505, Graphics Processing Pipeline 503 or Fragment Processing Pipeline 560 concludes with optional processing by a Raster Operations Unit 565.

Vertex programs are sequences of vertex program instructions compiled by Host Processor 514 for execution within Geometry Processor 530 and Rasterizer 550. Shader programs are sequences of shader program instructions compiled by Host Processor 514 for execution within Fragment Processing Pipeline 560. Geometry Processor 530 receives a stream of program instructions (vertex program instructions and shader program instructions) and data from Interface 517 or Memory Controller 520, and performs vector floating-point operations or other processing operations using the data. The program instructions configure subunits within Geometry Processor 530, Rasterizer 550 and Fragment Processing Pipeline 560. The program instructions and data are stored in graphics memory, e.g., portions of Host Memory 512, Local Memory 540, or storage resources within Programmable Graphics Processor 505. When a portion of Host Memory 512 is used to store program instructions and data the portion of Host Memory 512 can be uncached so as to increase performance of access by Programmable Graphics Processor 505. Alternatively, configuration information, including wrap mode information, is written to registers within Geometry Processor 530, Rasterizer 550 and Fragment Processing Pipeline 560 using program instructions, encoded with the data, or the like.

Data processed by Geometry Processor 530 and program instructions are passed from Geometry Processor 530 to a Rasterizer 550. Rasterizer 550 is a sampling unit that processes primitives and generates sub-primitive data, such as fragment data, including parameters associated with fragments (texture IDs, texture coordinates, and the like). Rasterizer 550 converts the primitives into sub-primitive data by performing scan conversion on the data processed by Geometry Processor 530. Rasterizer 550 outputs fragment data and shader program instructions to Fragment Processing Pipeline 560.

The shader programs configure the Fragment Processing Pipeline 560 to process fragment data by specifying computations and computation precision. Fragment Shader 555 is optionally configured by shader program instructions such that fragment data processing operations are performed in multiple passes within Fragment Shader 555. Fragment Shader 555 includes an embodiment of previously described Texture Unit 400. In one embodiment Texture Unit 400 is configured to read shader program instructions stored in Local Memory 540 or Host Memory 512 via Memory Controller 520.

Fragment Shader 555 outputs processed fragment data, e.g., color and depth, and codewords generated from shader program instructions to Raster Operations Unit 565. Raster Operations Unit 565 includes a read interface and a write interface to Memory Controller 520 through which Raster Operations Unit 565 accesses data stored in Local Memory 540 or Host Memory 512. Raster Operations Unit 565 optionally performs near and far plane clipping and raster operations, such as stencil, z test, blending, and the like, using the fragment data and pixel data stored in Local Memory 540 or Host Memory 512 at a pixel position (image location specified by x,y coordinates) associated with the processed fragment data. The output data from Raster Operations Unit 565 is written back to Local Memory 540 or Host Memory 512 at the pixel position associated with the output data and the results, e.g., image data are saved in graphics memory.

When processing is completed, an Output 585 of Graphics Subsystem 507 is provided using Output Controller 580. Alternatively, Host Processor 514 reads the image stored in Local Memory 540 through Memory Controller 520, Interface 517 and System Interface 515. Output Controller 580 is optionally configured by opcodes to deliver data to a display device, network, electronic control system, another computing system, such as Computing System 500, another graphics subsystem, such as Graphics Subsystem 507, or the like.

The invention has been described above with reference to specific embodiments. Persons skilled in the art will recognize, however, that various modifications and changes may be made thereto without departing from the broader spirit and scope of the invention as set forth in the appended claims. For example, in alternative embodiments, the method set forth herein may be implemented either partially or entirely in a software program or a fragment program executed by Fragment Shader 555. The foregoing description and drawings are, accordingly, to be regarded in an illustrative rather than a restrictive sense. The listing of steps in method claims do not imply performing the steps in any particular order, unless explicitly stated in the claim.

The invention claimed is:

1. A method of using a non-power of two texture map, (the non-power of two texture map having a dimension m, where $m \neq 2^i$, and i is an integer) comprising:

receiving a normalized texture map coordinate corresponding to the non-power of two texture map, wherein the normalized texture map coordinate has a value between 0 and 1;

receiving an LOD (level of detail) dimension corresponding to the non-power of two texture map;

obtaining a reduced portion of the normalized texture map coordinate; and scaling the reduced portion by the LOD dimension to compute an unnormalized texture map coordinate for the non-power of two texture map, wherein the unnormalized texture map coordinate has a value between 0 and the non-power of two LOD dimension−1.

2. The method of claim 1, wherein the LOD dimension is selected from the group consisting of a width, a height, and a depth.

3. The method of claim 1, wherein the normalized texture map coordinate corresponding to the non-power of two texture map is represented in a floating-point format.

4. The method of claim 1, wherein the step of obtaining a reduced portion of the normalized texture map coordinate comprises performing a wrap computation based on a wrap mode.

5. The method of claim 4, further comprising:

receiving another normalized texture map coordinate corresponding to the non-power of two texture map;

receiving another LOD dimension corresponding to the non-power of two texture map;

obtaining a reduced portion of the other normalized texture map coordinate; and scaling the reduced portion of the other normalized texture map coordinate by the other LOD dimension to compute another unnormalized texture map coordinate.

6. The method of claim 1, wherein the unnormalized texture map coordinate is used to determine an address of a texel within the non-power of two texture map.

7. The method of claim 1, wherein the texel is filtered as a function of a weight to produce a filtered texel for a fragment.

8. The method of claim 1, wherein the non-power of two texture map is a video image.

9. The method of claim 1, further comprising the step of filtering the non-power of two texture map to produce a second level of detail.

10. The method of claim 9, wherein a dimension of the second level of detail is not half of the dimension of the non-power of two texture map.

11. A coordinate computation unit for determining texture map coordinates for non-power of two texture maps (the non-power of two texture maps having a dimension m, where $m \neq 2^i$, and i is an integer), comprising:

a parameter conversion unit configured to receive a normalized texture coordinate corresponding to the non-power of two texture map and produce a reduced portion of the normalized texture coordinate; and a scale unit configured to receive the reduced portion of the normalized texture coordinate and scale the reduced portion of the normalized texture coordinate by a non-power of two LOD (level of detail) dimension for the non-power of two texture map to produce an unnormalized texture map coordinate for the non-power of two texture map, wherein the unnormalized texture map coordinate has a value between 0 and the non-power of two LOD dimension−1.

12. The coordinate computation unit of claim 11, wherein the parameter conversion unit determines the reduced portion responsive to a wrap mode specified by a fragment program.

13. The coordinate computation unit of claim 11, wherein the scale unit is configured to scale the reduced portion by a non-power of two LOD dimension.

14. The coordinate computation unit of claim 13, wherein the non-power of two LOD dimension is selected from the group consisting of width, height, and depth.

15. The coordinate computation unit of claim 11, wherein the coordinate computation unit is included in a texture unit, the texture unit comprising an address computation unit configured to receive the unnormalized texture coordinate and produce an address corresponding to a texel in the non-power of two texture map.

16. The coordinate computation unit of claim 15, wherein the texture unit is included within a programmable graphics processor, the programmable graphics processor including a rasterizer configured to produce the normalized texture coordinate.

* * * * *